J. OLSON.
MACHINE ELEMENT.
APPLICATION FILED OCT. 17, 1910.
1,043,247.
Patented Nov. 5, 1912.
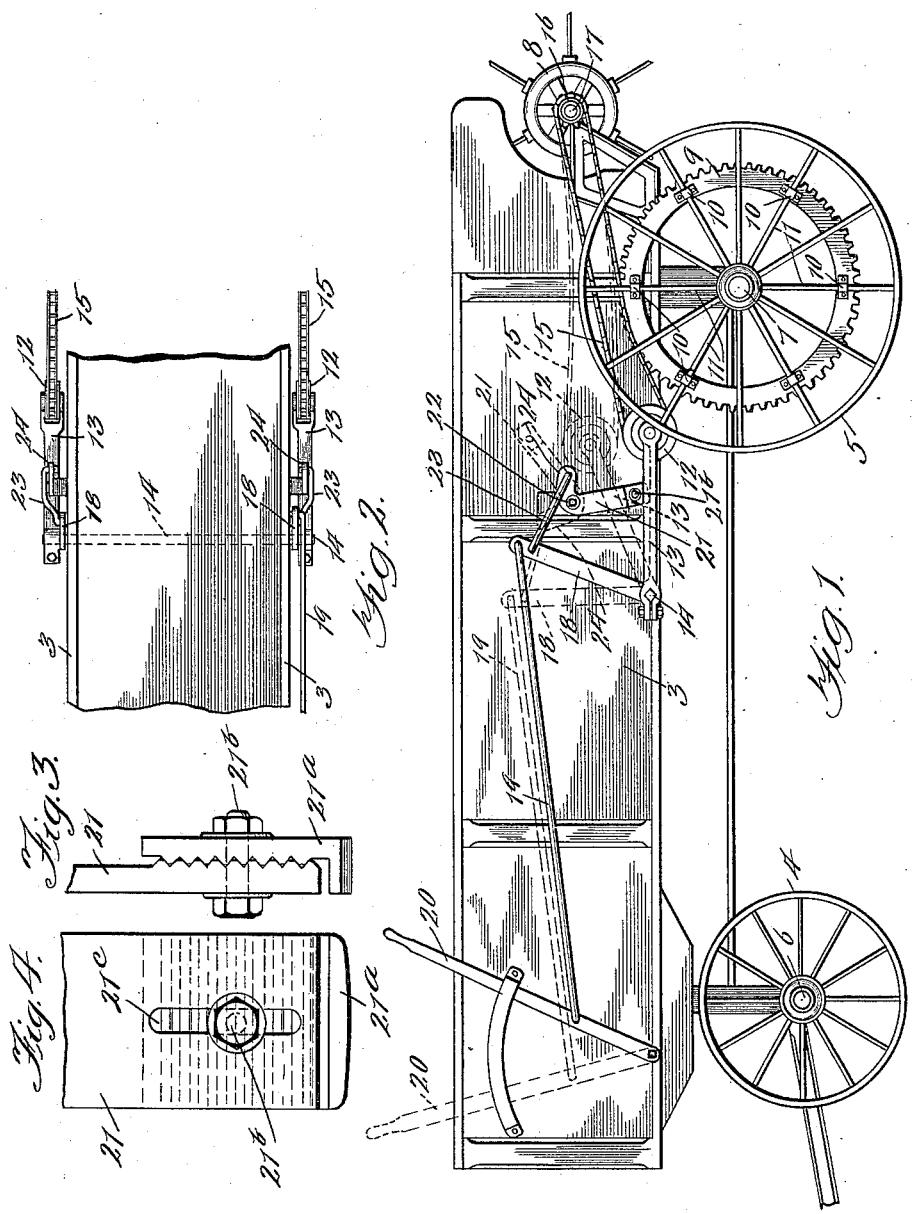

UNITED STATES PATENT OFFICE.

JOHN OLSON, OF BRADLEY, ILLINOIS, ASSIGNOR TO SEARS, ROEBUCK & COMPANY, OF CHICAGO, ILLINOIS, A CORPORATION OF NEW YORK.

MACHINE ELEMENT.

1,043,247.    Specification of Letters Patent.    Patented Nov. 5, 1912.

Application filed October 17, 1910. Serial No. 587,611.

*To all whom it may concern:*

Be it known that I, JOHN OLSON, a citizen of the United States, residing at Bradley, in the county of Kankakee and State of Illinois, have invented certain new and useful Improvements in Machine Elements, of which the following is a specification, reference being had to the accompanying drawings.

My invention relates to machine elements, and in the embodiment thereof illustrated it has to do more particularly with wagon-box manure spreaders, in which the manure is delivered by means of a rotary distributer mounted at the rear end of the wagon-bed and operated by sprocket-wheel and chain mechanism driven from the rear wheels.

It has for its object to provide certain improvements in mechanism for locking the sprocket-wheel and chain driving mechanism in operative engagement. I accomplish this object as illustrated in the drawings and as hereinafter described.

What I regard as new is set forth in the claims.

In the accompanying drawings,—Figure 1 is a side elevation showing a manure spreader in part, such parts being illustrated as are necessary to a full understanding of my invention; Fig. 2 is a partial plan view; Fig. 3 is an enlarged detail, being an edge view of one of the locking levers, showing the adjustable foot carried thereby; and Fig. 4 is a face view thereof.

Referring to the drawings,—3 indicates the wagon-bed or box, which is mounted on front and rear wheels 4—5,—6 indicating the front axle and 7 the rear axle.

8 indicates the distributer, which is mounted transversely of the wagon-bed at the rear end thereof, being rotatably supported in any suitable way.

9 indicates sprocket-wheels, which are mounted on the rear wheels 5 adjacent to the inner faces thereof and are fixedly secured to said wheels preferably by clips 10 which engage the spokes 11 of said wheels, as shown in Fig. 1.

12 indicates idler sprocket-wheels, one of which is mounted at each side of the wagon-bed, being carried by arms 13 secured upon the ends of a rock-shaft 14 which extends transversely of the bed and is supported in suitable bearings so that it may rock freely.

15 indicates driving-chains, which are mounted on the idlers 12 and pass around sprocket-wheels 16 secured to the ends of the distributer 8, being preferably mounted upon the ends of a shaft 17 about which said distributer rotates, as shown in Fig. 1. The idlers 12 and sprocket-wheels 16 are in the same vertical plane as the sprocket-wheels 9, which may be termed the "driving wheels," and are at opposite sides of said driving wheels, the idlers 12 being in front of the driving wheels and the sprocket-wheels 16 back of them, as clearly shown in Fig. 1. It will be apparent, therefore, that by swinging the arms 13 downward and thereby carrying the idlers 12 down into the position shown in Fig. 1, the chains 15 may be caused to engage the driving wheels 9, and by swinging the arms 13 upward far enough, the chains 15 may be disengaged from the driving wheels 9, as indicated by dotted lines in Fig. 1,—thus disconnecting the distributer 8 from the driving mechanism.

For conveniently swinging the arms 13, the rock-shaft 14 is provided with upwardly-extending arms 18 at each of its ends, one of said arms being connected by a connecting rod 19 with a lever 20 provided at the front end of the wagon-bed, as shown in Fig. 1. By swinging the lever 20 forward, the driving mechanism may be disconnected, thereby stopping the distributer 8.

The mechanism thus far described is old and well known and is not herein claimed. My invention has to do more particularly with the mechanism for locking the driving gear in operative position and for unlocking the same when it is desired to disconnect it. Such locking mechanism comprises arms 21, which are pivotally secured to the sides of the wagon-bed, as shown at 22 in Fig. 1, and extend downward in the plane of the arms 13. Said arms 21 are of such length that when they are in approximately vertical position they engage the arms 13 and hold them down in their lowermost position thereby holding the chains 15 in engagement with the driving wheels 9. For the purpose of adjusting the length of the arms 21 so as to cause them to properly engage the arms 13, each of the arms 21 is provided with a separate foot 21ᵃ which is adjustable longitudinally upon the arm 21 and is securely held in position by a bolt 21ᵇ, as best shown in Figs. 3 and 4,—said bolt passing through a slot 21ᶜ in the arm 21. The arms 21 may be swung backward thereby releasing the arms 13, and permitting them to be lifted in the manner hereinbefore described. The locking arms 21 are automatically operated to release the arms 13 when the lever 20 is operated to lift the latter arms by means of links 23 which are connected to the upper portions of the arms 18 and to arms 24 which extend rearwardly from the upper portions of the locking arms 21, with which they are fixedly secured. Preferably the arms 21 and 24 are made integral with each other, being substantially in the form of a bell-crank lever. It will be understood that one of the locking arms 21 with the mechanism for operating it is provided at each side of the wagon-bed. When the lever 20 is operated to lift the arms 13 and disconnect the chains 15 from the driving wheels 9, the forward movement of the arms 18 acts through the connecting rods 23 to pull the arms 24 up, thereby swinging the locking arms 21 back out of operative engagement with the arms 13 and permitting said arms to rise. When the lever 20 is thrown back to lower the arms 13 the locking arms 21 are automatically moved into their locking position, thereby firmly holding the chains 15 in operative engagement with the driving wheels 9.

While the best results are secured by providing the driving mechanism and the locking mechanism above described at both sides of the bed, my invention is not limited to providing two sets of driving and locking devices. Furthermore, while I have shown my improvements as applied to a manure spreader, they may be used in any other situation to which they are adapted.

That which I claim as my invention, and desire to secure by Letters Patent, is,—

1. The combination of a sprocket, a driving-chain movable into and out of engagement therewith, a rock-shaft, an arm connected with said rock-shaft, a sprocket-wheel carried by said arm, said sprocket-wheel supporting one end portion of said chain, a lever for rocking said rock-shaft, a swinging locking arm adapted to engage said first-mentioned arm and hold it in operative position, and means actuated by the rocking of said shaft to move the chain out of operative position for moving said locking arm out of operative position.

2. The combination of a sprocket, a driving-chain movable into and out of engagement therewith, a rock-shaft, an arm connected with said rock-shaft, a sprocket-wheel carried by said arm, said sprocket-wheel supporting the forward end portion of said chain, a lever for rocking said shaft, a locking device for holding said chain in operative position comprising a pivotally-supported bell-crank lever adapted to engage said arm and prevent upward movement thereof, and means connected with said bell-crank lever and with said first-mentioned lever for releasing said first-mentioned arm to permit the chain to be raised out of operative position.

3. The combination of a sprocket, a driving-chain movable into and out of engagement therewith, a rock-shaft, an arm connected with said rock-shaft, a sprocket-wheel carried by said arm, said sprocket-wheel supporting the forward end portion of said chain, a lever for rocking said shaft, a swinging locking arm adapted to engage said first-mentioned arm and hold it in operative position, an adjustable foot carried by said locking arm, and means actuated by the rocking of said shaft to move the chain out of operative position for moving said locking arm out of operative position.

4. The combination of a sprocket, a driving-chain movable into and out of engagement therewith, a rock-shaft, an arm connected with said rock-shaft, a sprocket-wheel carried by said arm, said sprocket-wheel supporting the forward end portion of said chain, a lever for rocking said shaft, a locking device for holding said chain in operative position comprising a pivotally-supported bell-crank lever, an adjustable foot carried by said bell-crank lever, and means connected with said bell-crank lever and with said first-mentioned lever for releasing said first-mentioned arm to permit the chain to be raised out of operative position.

JOHN OLSON.

Witnesses:
W. R. BOND,
J. C. HAGEARTY.

---

Copies of this patent may be obtained for five cents each, by addressing the "Commissioner of Patents. Washington, D. C."